(12) United States Patent
Song et al.

(10) Patent No.: US 9,658,378 B2
(45) Date of Patent: May 23, 2017

(54) HOLOGRAPHIC 3D IMAGE DISPLAY APPARATUS AND ILLUMINATION UNIT FOR THE SAME

(71) Applicant: Samsung Electronics Co., Ltd., Suwon-si (KR)

(72) Inventors: Hoon Song, Yongin-si (KR); Gee-young Sung, Daejeon (KR); Kang-hee Won, Seoul (KR); Hong-seok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 14/180,414

(22) Filed: Feb. 14, 2014

(65) Prior Publication Data
US 2014/0285862 A1 Sep. 25, 2014

(30) Foreign Application Priority Data
Mar. 19, 2013 (KR) .................. 10-2013-0029241

(51) Int. Cl.
*G02B 5/32* (2006.01)
*G03H 1/22* (2006.01)
(Continued)

(52) U.S. Cl.
CPC .............. *G02B 5/32* (2013.01); *G02B 27/225* (2013.01); *G03H 1/2286* (2013.01);
(Continued)

(58) Field of Classification Search
CPC ...... G03H 1/04; G03H 1/0402; G03H 1/0404; G03H 1/0406; G03H 1/041; G03H 1/0413;
(Continued)

(56) References Cited

U.S. PATENT DOCUMENTS 3,765,741 A * 10/1973 Kimura .................. G03B 33/10
359/22
6,018,402 A * 1/2000 Campbell ................ G02B 5/32
359/11
(Continued)

FOREIGN PATENT DOCUMENTS

| KR | 10-0634511 B1 | 10/2006 | | |
|---|---|---|---|---|
| KR | 10-2009-0105346 A | 10/2009 | | |
| WO | WO 2011039286 | * 4/2011 | ......... | H04N 13/0454 |

*Primary Examiner* — Bumsuk Won
*Assistant Examiner* — Collin X Beatty
(74) *Attorney, Agent, or Firm* — Sughrue Mion, PLLC

(57) ABSTRACT

An illumination unit is provided including a coherent light source; a projection optical element which focuses a light beam emitted from the coherent light source onto a focal plane; and a holographic optical element interposed between the coherent light source and the projection optical element, and having an interference pattern formed thereon. The holographic optical element diffracts the light beam emitted from the coherent light source and emits the diffracted light to the projection optical element. Here, the interference pattern on the holographic optical element may have information that diffracts the light beam and thereby cancels a diffraction of the light beam due to an aberration of the projection optical element.

13 Claims, 5 Drawing Sheets

(51) Int. Cl.
*G02B 27/22* (2006.01)
*G03H 1/04* (2006.01)

(52) U.S. Cl.
CPC ........... *G03H 1/2294* (2013.01); *G03H 1/041* (2013.01); *G03H 2001/0434* (2013.01); *G03H 2001/0439* (2013.01); *G03H 2001/221* (2013.01); *G03H 2001/2242* (2013.01); *G03H 2210/30* (2013.01); *G03H 2222/18* (2013.01); *G03H 2222/34* (2013.01)

(58) Field of Classification Search
CPC ............... G03H 1/2286; G03H 1/2294; G03H 2001/0413; G03H 2001/0415; G03H 2001/0419; G03H 2001/0434; G03H 2001/0439; G03H 2001/221; G03H 2001/22242; G03H 2001/2242; G03H 2210/30; G03H 2222/18; G03H 2222/34; G02B 5/32; G02B 27/225
USPC ...... 359/1, 3, 10, 11, 15, 16, 20, 22, 23, 24, 359/28, 29, 32, 33, 573; 349/15
See application file for complete search history.

(56) References Cited

U.S. PATENT DOCUMENTS

| | | | | |
|---|---|---|---|---|
| 6,163,390 | A * | 12/2000 | Kanda | G02B 5/32 348/E7.08 |
| 6,195,184 | B1 * | 2/2001 | Chao | G03H 1/08 359/22 |
| 7,414,769 | B2 | 8/2008 | Slinger | |
| 7,471,430 | B1 * | 12/2008 | Andersen | G02B 5/32 359/15 |
| 2005/0036180 | A1 * | 2/2005 | Petersen | G02B 5/203 359/15 |
| 2006/0139711 | A1 * | 6/2006 | Leister | G03H 1/0808 359/9 |
| 2008/0198431 | A1 * | 8/2008 | Schwerdtner | G02B 5/1876 359/32 |
| 2009/0086298 | A1 * | 4/2009 | Okorogu | G02B 5/1876 359/15 |
| 2009/0237760 | A1 * | 9/2009 | Przygodda | G11B 7/0065 359/10 |
| 2009/0252018 | A1 * | 10/2009 | Tanabe | G02B 5/1876 369/112.15 |
| 2009/0303212 | A1 * | 12/2009 | Akutsu | G02B 5/203 345/204 |
| 2010/0214634 | A1 | 8/2010 | Kroll et al. | |
| 2010/0231997 | A1 * | 9/2010 | Fontecchio | G02F 1/13342 359/3 |
| 2010/0284180 | A1 * | 11/2010 | Popovich | G02B 5/32 362/231 |
| 2011/0122467 | A1 | 5/2011 | Futterer et al. | |
| 2011/0194163 | A1 * | 8/2011 | Shimizu | G02B 5/32 359/15 |
| 2011/0199658 | A1 | 8/2011 | Blanche et al. | |
| 2012/0008181 | A1 * | 1/2012 | Cable | G03H 1/08 359/9 |
| 2012/0019883 | A1 | 1/2012 | Chae et al. | |
| 2012/0235900 | A1 * | 9/2012 | Border | G02B 5/23 345/156 |
| 2013/0222384 | A1 * | 8/2013 | Futterer | G02B 5/32 345/426 |
| 2013/0271731 | A1 * | 10/2013 | Popovich | H01L 33/10 353/31 |
| 2014/0022615 | A1 * | 1/2014 | Clemens | G02B 5/32 359/10 |
| 2014/0055692 | A1 * | 2/2014 | Kroll | G02F 1/1347 349/15 |
| 2014/0355985 | A1 * | 12/2014 | Chu | G02F 1/292 398/49 |

* cited by examiner

HOLOGRAPHIC 3D IMAGE DISPLAY APPARATUS AND ILLUMINATION UNIT FOR THE SAME

CROSS-REFERENCE TO RELATED APPLICATION

This application claims the benefit of Korean Patent Application No. 10-2013-0029241, filed on Mar. 19, 2013, in the Korean Intellectual Property Office, the disclosure of which is incorporated herein in its entirety by reference.

BACKGROUND

1. Field

Apparatuses and methods consistent with exemplary embodiments relate to holographic 3-dimensional (3D) image display apparatuses and illumination units for the same, and more particularly, to illumination units having optical systems with improved aberration and holographic 3D display apparatuses including the same.

2. Description of the Related Art

Nowadays, in various fields, such as movies, games, advertising, education, the military, and the like, 3-dimensional (3D) image display apparatuses are in great demand to produce images realistically and effectively. Accordingly, various technologies for displaying 3D images have been developed, and various 3D image display apparatuses are already used.

3D image display apparatuses, for example, are categorized as glasses apparatuses and a glasses-free apparatuses. In addition, glasses apparatuses are categorized as polarized glasses apparatuses and shutter glasses apparatuses. A glasses-free apparatus may use stereoscopy, and may be a lenticular apparatus which uses a plurality of cylindrical lens arrays or a parallax barrier apparatus including a plurality of barriers and openings. However, the above-described apparatuses based on stereoscopy take advantage of the binocular parallax between the eyes, and thus, there are limitations in increasing the number of viewpoints, and viewers may also feel fatigued due to a mismatch of a stereoscopic depth recognized by the brain and the focus of the eyes. In addition, these apparatuses provide only horizontal parallax and not vertical parallax.

As a 3D image display apparatus capable of matching the stereoscopic depth recognized by the brain and the focus of the eyes and providing full parallax, a holographic apparatus and an integrated image apparatus have been suggested. A holographic image apparatus allows a signal beam having an image signal to interfere with a reference beam. An integrated image apparatus displays a 3D image by using a fly-eye lens, which includes an array of a plurality of micro lenses.

A holographic 3D image display apparatus generally includes an illumination unit and a spatial light modulator (SLM). The illumination unit plays provides a light beam having a controlled phase and amplitude to the SLM. The illumination unit may include a coherent light source, such as a laser, a spatial filter, a projection optical system, and the like. The projection optical system may include a lens or a mirror. In order to provide a light beam emitted from a light source which uniformly illuminates the entire region of the SLM, a size of the lens or the mirror of the illumination unit may be similar to or greater than that of the SLM. The SLM performs phase modulation or amplitude modulation on a light beam incident from the illumination unit, and, by using light diffraction and interference, allows a stereoscopic image to be formed at a predetermined position in space.

SUMMARY

One or more exemplary embodiments may provide methods and apparatuses for illumination units having optical systems with improved aberration and holographic 3D display apparatuses including the same.

Additional exemplary aspects will be set forth in part in the description which follows and, in part, will be apparent from the description, or may be learned by practice of the presented embodiments.

According to an aspect of an exemplary embodiment, an illumination unit includes: a coherent light source; a projection optical element focusing a light beam emitted from the coherent light source onto a focal plane; and a holographic optical element interposed between the coherent light source and the projection optical element. The holographic optical element includes an interference pattern formed thereon, which diffracts the light beam emitted from the coherent light source and directs the light beam to the projection optical element. The interference pattern on the holographic optical element has information which diffracts the light beam and thereby cancels a diffraction of the light beam due to an aberration of the projection optical element.

The holographic optical element may include a plurality of holographic optical elements arrayed to allow an input light beam to be focused at different positions on the focal plane.

The plurality of holographic optical elements may be arrayed in a direction perpendicular to an optical axis of the projection optical element.

The coherent light source may include a plurality of coherent light sources respectively corresponding to the plurality of holographic elements.

The projection optical element may be an elliptic mirror having a concave reflecting surface.

The projection optical element may include: a first projection optical element collimating a light beam incident thereon; and a second projection optical element focusing the parallel light beam onto the focal plane.

The first projection optical element may be an elliptic mirror having a concave reflecting surface.

The second projection optical element may be one of a refractive lens, a Fresnel lens, a holographic optical lens, and an electrowetting prism array electrically controlling a refractive direction of a light beam.

The holographic optical element may have a single layered structure diffracting all red, green, and blue light beams.

The holographic optical element ma include a first layer diffracting a blue light beam, a second layer diffracting a green light beam, and a third layer diffracting a red light beam.

According to an aspect of another exemplary embodiment, a holographic 3 dimensional (3D) image display apparatus includes: a coherent light source; a projection optical element focusing a light beam emitted from the coherent light source onto a focal plane; and a holographic optical element interposed between the coherent light source and the projection optical element. The holographic optical element includes an interference pattern formed thereon, which diffracts the light beam emitted from the coherent light source and directs the light beam to the projection optical element. The display apparatus also includes a spatial light modulator modulating an input light beam to form a stereoscopic image at a focal plane position of the projection optical element. The interference pattern on the holographic optical element has information that diffracts the light beam and thereby cancels a diffraction of the light beam due to an aberration of the projection optical element.

The projection optical element may include: a first projection optical element collimating a light beam passing through the holographic optical element; and a second projection optical element focusing the collimated light beam onto the focal plane.

The spatial light modulator may be interposed between the first projection optical element and the second projection optical element.

The second projection optical element may be interposed between the first projection optical element and the spatial modulator.

The spatial modulator may be one of a phase modulator modulating a phase of an input light beam, an amplitude modulator modulating the brightness of an input light beam, and a complex modulator modulating both a phase and brightness of an input light beam.

According to an aspect of another exemplary embodiment, a method of manufacturing an illumination unit, includes: disposing a photosensitive film on a top surface of a projection optical element, where the projection optical element focuses a light beam; splitting a single coherent light beam into first and second light beams; directing the first light beam to a bottom surface of the photosensitive film; directing the second light beam to an object lens positioned on a focal plane of the projection optical element; the object lens emitting the second light beam as a spherical wave; the projection optical element focusing the second light beam from the object lens onto the bottom surface of the photosensitive film; and recording, on the photosensitive film, an interference pattern formed by the first light beam, incident on the bottom surface of the photosensitive film, interfering with the second light beam focused on the bottom surface of the photosensitive film.

The object lens may be sequentially repositioned at different positions on the focal plane of the projection optical element, and the disposing of the photosensitive film to the recording of the interference pattern may be repeated.

The projection optical element may include: a first projection optical element collimating a light beam passing through the holographic optical element; and a second projection optical element focusing the collimating light beam onto the focal plane.

The object lens may be configured such that the second projection optical element collimates the second light beam incident thereon from the object lens.

The method of manufacturing an illumination unit may further include disposing a spatial filter removing an optical component having an inconsistent phase or an inconsistent direction with the second light beam, between the object lens and the projection optical element.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
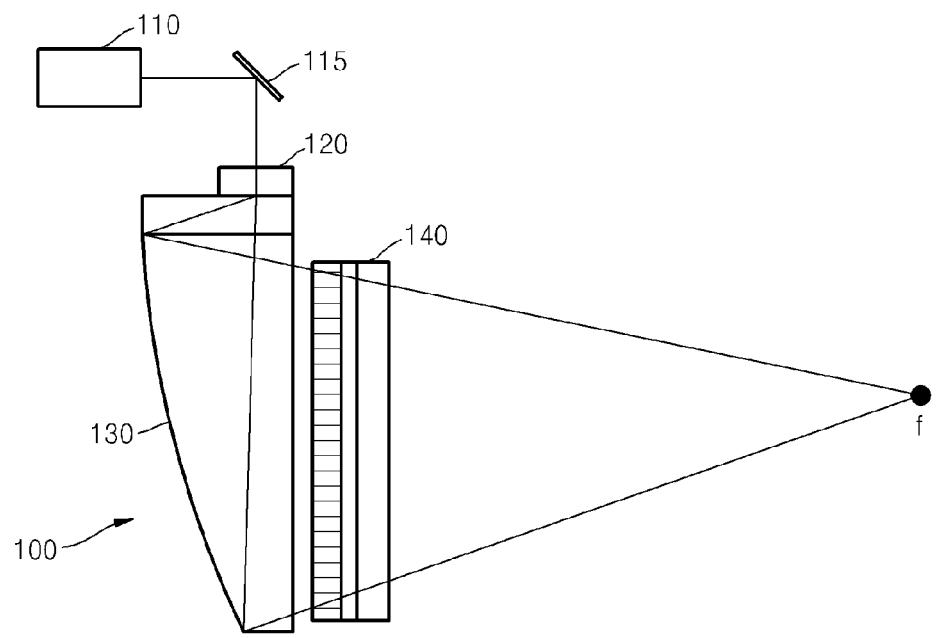
FIG. 1 is a side view schematically illustrating an illumination unit and a holographic 3-dimensional (3D) image display apparatus including the illumination unit, according to an exemplary embodiment.

Reference will now be made in detail to exemplary embodiments which are illustrated in the accompanying drawings, wherein like reference numerals refer to like elements throughout. In the drawings, the thicknesses and areas of layers and regions are enlarged or exaggerated for clarity. In this regard, the exemplary embodiments may have different forms and should not be construed as being limited to the descriptions set forth herein. Accordingly, the exemplary embodiments are merely described below, by referring to the figures, to explain aspects of the present description. It will also be understood that when a layer, a region, or an element is referred to as being "on" or "above" another layer or substrate, it can be directly on the other layer or substrate, or intervening layers may also be present.

FIG. 1 is a side view schematically illustrating an illumination unit and a holographic 3-dimensional (3D) image display apparatus 100 including the illumination unit. Referring to FIG. 1, the holographic 3D image display apparatus 100 according to an exemplary embodiment may include a coherent light source 110, such as a laser, a projection optical element 130 for focusing a light beam emitted from the coherent light source 110, a holographic optical element (HOE) 120 interposed between the coherent light source 110 and the projection optical element 130, and a spatial light modulator (SLM) 140 for modulating an input light to allow a stereoscopic image to be formed at a predetermined position in space. In FIG. 1, the coherent light source 110, the HOE 120, and the projection optical element 130 form an illumination unit.

The projection optical element 130 may be, for example, an elliptical mirror having a concave reflecting surface. However, the elliptical mirror as shown in FIG. 1 is only an example of the projection optical element 130, and another optical element, such as a refractive lens or a diffractive lens, may be adopted as the projection optical element 130. In the embodiment of FIG. 1, the projection optical element 130 may focus a light beam on a focal plane f (also see the focal plane defined by viewpoints A-G in FIG. 2).

In the HOE 120, an interference pattern may be formed to diffract a light beam emitted from the coherent light source 110, and to direct the light beam to the projection optical element 130. This interference pattern of the HOE 120 includes a reverse aberration capable of canceling the aberration of the projection optical element 130, thereby improving the quality of an image formed through the SLM 140. For example, the light beam emitted from the coherent light source 110 may be incident on a top surface of the HOE 120 via a plane mirror 115. Then, a light beam diffracted by the interference pattern formed in the HOE 120 may be output through a bottom surface of the HOE 120. Since this diffracted light beam has an aberration that is the opposite of an aberration of the projection optical element 130, the light beam may be without aberration when being focused on the focal plane f.

In FIG. 1, the light beam emitted from the coherent light source 110 is illustrated as reflecting off the plane mirror 115 and then being incident on the top surface of the HOE 120, but this is only an example. In another exemplary embodiment, instead of the plane mirror 115, another optical transfer unit, such as a prism or an optical fiber, may be adopted. Also, the coherent light source 110 may be disposed to directly face the top surface of the HOE 120.

The SLM 140 may be a phase modulator for modulating a phase of an input light beam, an amplitude modulator for modulating brightness of an input light beam, or a complex modulator for modulating a phase and brightness of an input light beam. A light beam modulated by the SLM 140 may form a stereoscopic image at a certain position in space due to diffraction and interference. For example, the stereoscopic image may be formed on a focal plane f of the projection optical element 130.

Even though the side view of FIG. 1 shows just one HOE 120, a plurality of holographic optical elements 120 may be arrayed according to the number of view-points of the stereoscopic image to be provided by the holographic 3D image display apparatus 100. For example, FIG. 2 is a top view schematically illustrating a configuration of the illumination unit and the holographic 3D image display apparatus 100 in FIG. 1.

Figure 2:
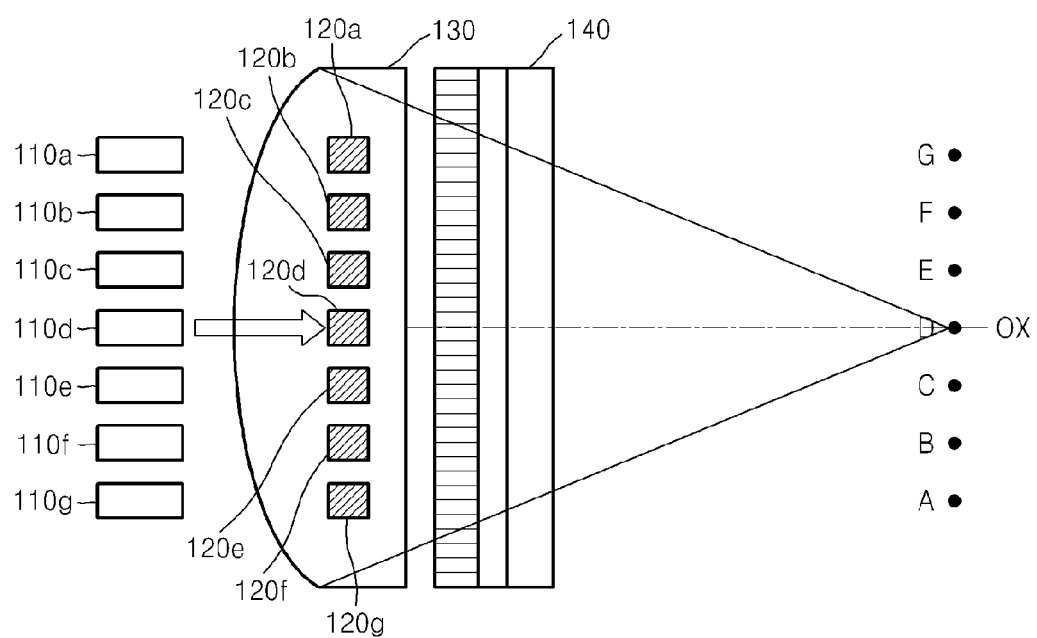
FIG. 2 is a top view schematically illustrating the illumination unit and a configuration of a holographic 3D image display apparatus including the illumination unit in FIG. 1.

Referring FIG. 2, a plurality of HOEs 120a to 120g may be arrayed along a direction perpendicular to an optical axis OX of the projection optical element 130 on a top portion of the projection optical element 130. Also, a plurality of coherent light sources 110a to 110g may be arrayed respectively in correspondence with the HOEs 120a to 120g. The number of HOEs 120a to 120g may be the same as the number of viewpoints of stereoscopic images provided by the holographic 3D image display apparatus 100. In FIG. 2, seven HOEs 120a to 120g and seven coherent light sources 110a to 110g are exemplarily illustrated, but the present embodiment is not limed thereto and the number of HOEs and coherent light sources may be changed according to the number of viewpoints. In addition, just one HOE 120 may be used regardless of the number of viewpoints. For example, a single long HOE 120 that extends along a direction perpendicular to the optical axis OX of the projection optical element 130 may be also used to provide a plurality of viewpoints.

Instead of the plurality of coherent light sources 110a to 110g, only one coherent light source 110 may be used. For example, a single light beam may be divided into a plurality of light beams by using a beam splitter or the like, and the plurality of light beams may be respectively provided to the HOEs 120a to 120g. In this case, an optical shutter for controlling transmission/blocking of the light beam may be disposed on an optical incident surface of each of the plurality of HOEs 120a to 120g. In addition, each of the plurality of coherent light sources 110a to 110g may include, for example, a red light beam-emitting laser, a green light beam-emitting laser, an a blue light beam-emitting laser. The coherent light sources 110a to 110g may provide a white visible light beam by using these red, green, and blue light beam-emitting lasers.

Referring to FIG. 2 again, a light beam emitted from the coherent light source 110a may be focused at a viewpoint A on a focal plane through the HOE 120a and the projection optical element 130. Also, a light beam emitted from the fourth coherent light source 110d may be focused at a viewpoint D on the focal plane through a fourth HOE 120d and the projection optical element 130. A light beam emitted from a seventh coherent light source 110g may be focused at a viewpoint G on the focal plane through a seventh HOE 120g and the projection optical element 130. Accordingly, an image may be formed at one or more desired viewpoints by turning on and off one or more of the plurality of coherent light sources 110a to 110g.

Normally, since a focus of the projection optical element 130 is positioned at a viewpoint D on the optical axis OX, an image formed at a viewpoint G or A, which is deviated from the viewpoint D, may be greatly distorted by an aberration of the projection optical element 130. According to the present embodiment, however, since the aberration of the projection optical element 130 may be canceled by using the HOEs 120a to 120g, even the image formed at a viewpoint G or A may not affected by the aberration of the projection optical element 130. Accordingly, the holographic 3D image display apparatus 100 according to the present embodiment may form an image having a plurality of viewpoints spanning a large area without aberration, and the size of the apparatus may be reduced due to not requiring an additional optical system for removing the aberration.

Figure 3:
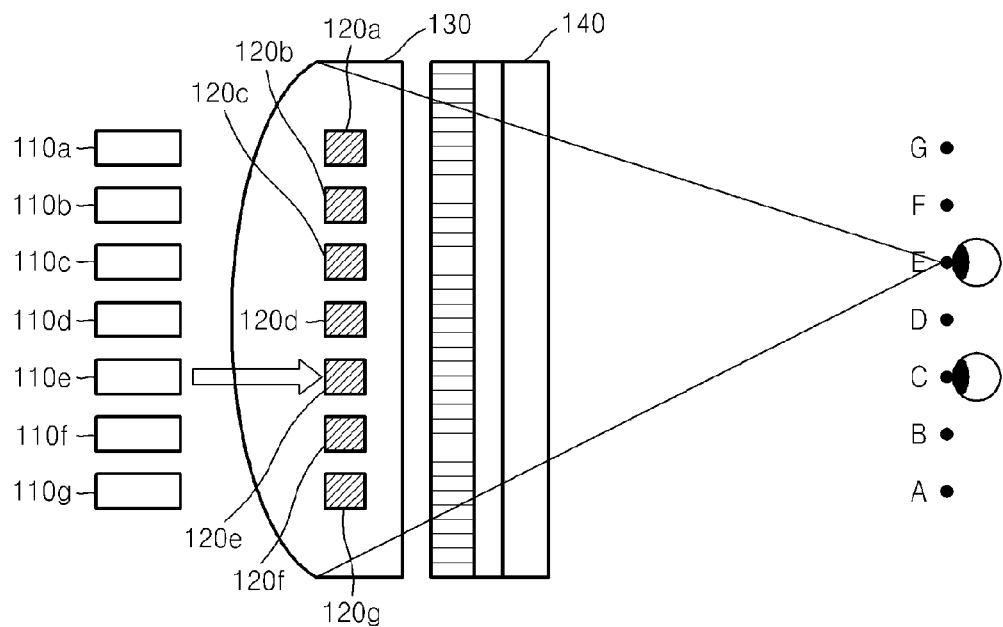
FIGS. 3 and 4 are top views schematically illustrating operations of the illumination unit and the holographic 3D image display apparatus including the illumination unit in FIG. 2.
Figure 4:
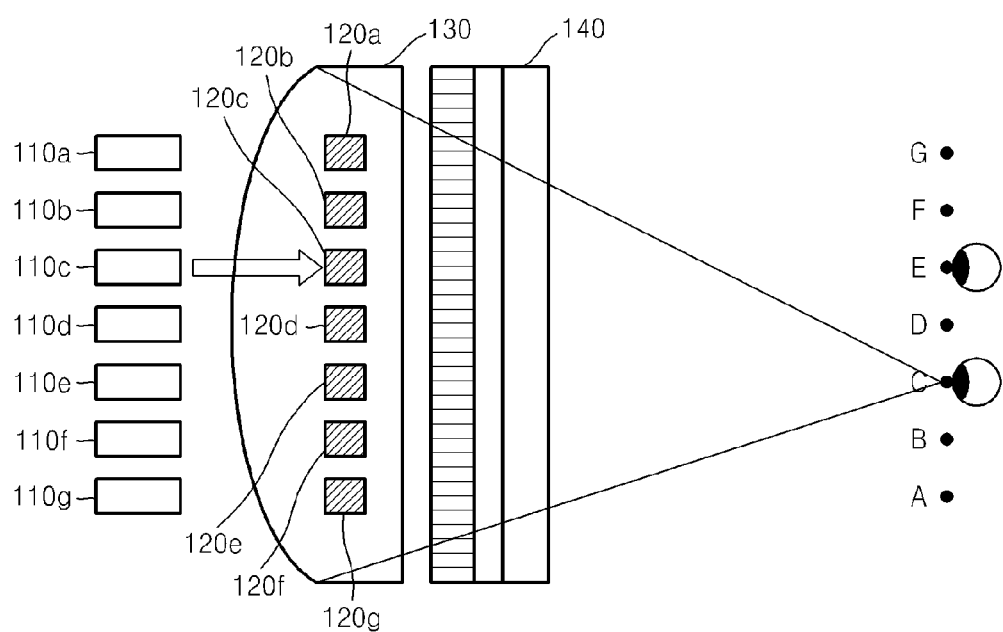

FIGS. 3 and 4 are top views illustrating exemplary operations of the holographic 3D image display apparatus 100. Referring to FIGS. 3 and 4, for example, when the eyes of a viewer are at viewpoints C and E, a third coherent light source 110c and a fifth coherent light source 110e may be alternately turned on or off. Also, the SLM 140 may operate to alternately form two viewpoint images that are respectively shown to the left eye and the right eye of the viewer in synchronization with an on or off period of the third and fifth coherent light sources 110c and 110e. Then, as shown in FIG. 3, an operation of providing an image at a viewpoint E to the right eye of the viewer, and an operation of providing an image at a viewpoint C to the left eye of the viewer may be repeated. According to this, the viewer may view a stereoscopic image. Even when the viewer moves to another position, eye positions may be determined and operations of the coherent light sources 110a to 110g and the SLM 140 may be controlled.

Figure 5:
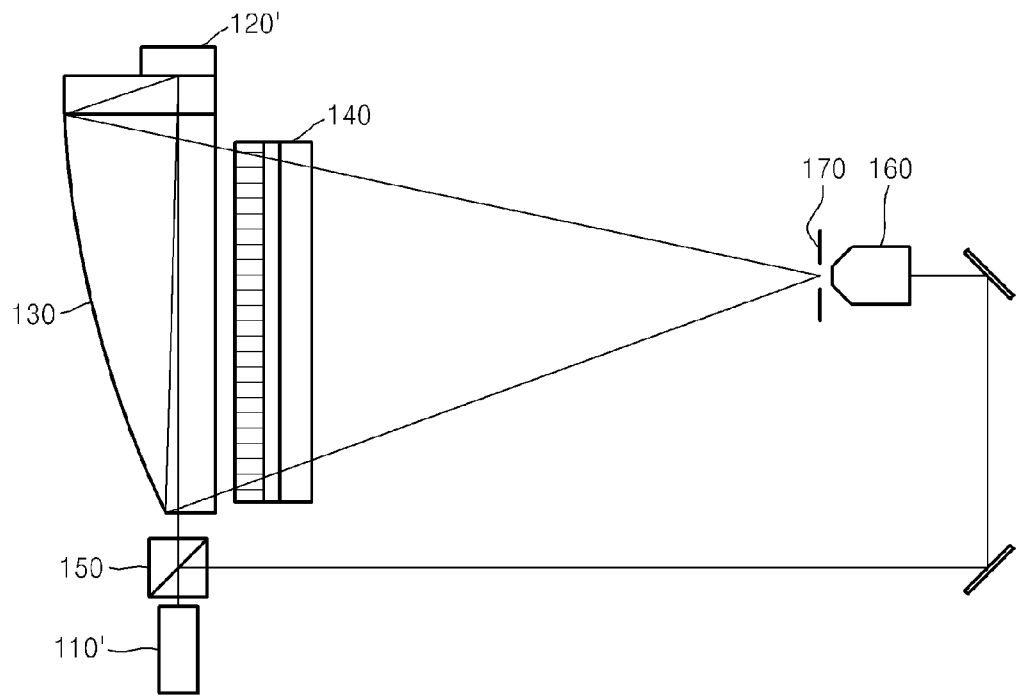
FIG. 5 is a side view schematically illustrating a method of forming a holographic optical element of the illumination unit in FIG. 1.

FIG. 5 is a side view schematically illustrating a method of forming the HOE 120 of the illumination unit in FIG. 1. Referring to FIG. 5, a photosensitive film 120' is disposed on a top surface of the projection optical element 130. A position of the photosensitive film 120' is the same as that of the HOE 120 in FIG. 1. Also, the light beam emitted from a coherent light source 110' is split into two light beams by using a beam splitter 150. One of the two light beams is incident on a bottom surface of the photosensitive film 120', and the other light beam is incident on an object lens 160 positioned at the focal plane of the projection optical element 130. The object lens 160 changes the light beam to a spherical wave diverged towards the projection optical element 130. A spatial filter 170 removing an optical component, which is inconsistent with the light beam in phase or direction, may be interposed between the object lens 160 and the projection optical element 130. A light beam incident on the projection optical element 130 by the object lens 160 may be reflected by the projection optical element 130 and incident on the photosensitive film 120'. Here, the object lens 160 may be configured to allow the light beam heading towards the photosensitive film 120' via the projection optical element 130 to be focused on the photosensitive film 120'.

Then, the light beam directly incident on the bottom surface of the photosensitive film 120' and the light beam incident on the bottom surface of the photosensitive film 120' through the object lens 160 interfere with each other and form an interference pattern. The interference pattern may be recorded on the photosensitive film 120'. Accordingly, when the photosensitive film 120' having the interference pattern recorded thereon is developed, the interference pattern is fixed, and the HOE 120 as shown in FIG. 1 may be obtained.

Similarly, the plurality of HOE 120a to 120g may be obtained by forming spherical waves respectively having a center at the viewpoints A, B, C, D, E, F, and G. For example, the HOE 120a may be formed by emitting a spherical wave to the projection optical element 130 with the object lens 160 positioned at the viewpoint A. Then, the second HOE 120b may be formed in the above-described scheme with the object lens 160 positioned at the viewpoint B.

Referring to FIG. 1 again, the HOE 120 obtained by the above-described scheme may be disposed at a position of the photosensitive film 120' in FIG. 5 and the coherent light source 110 may be disposed at a position coordinated with a position of the coherent light source 110' in FIG. 5. Here, the coherent light source 110 may emit a light beam having the same wavelength as that of a light beam emitted from the coherent light source 110' in FIG. 5. The light beam emitted from the coherent light source 110 passes through the HOE 120, and then is focused on the position of the object lens 160 in FIG. 5. The light beam, focused on the position of the object lens 160 in this way, has the same characteristics as and a reverse direction to the original light beam used for recording in FIG. 5, namely, is not affected by the aberration of the projection optical element 130. Accordingly, the HOE 120 compensates for the aberration of the projection optical element 130.

Figure 6:
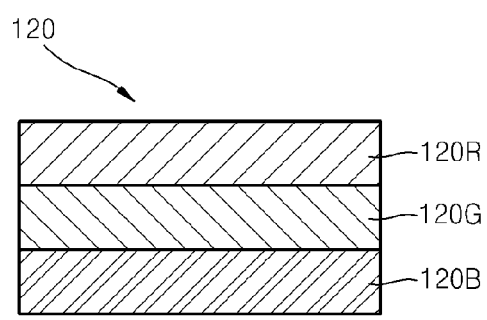
FIG. 6 is a cross-sectional view schematically illustrating an exemplary structure of a holographic optical element.

The HOE 120 may have three layers respectively diffracting red, green, and blue light beams. FIG. 6 is a cross-sectional view schematically illustrating an exemplary structure of the HOE 120. Referring to FIG. 6, the HOE 120 may include a first layer 120B diffracting a blue light beam, a second layer 120G diffracting a green light beam, and a third layer 120R diffracting a red light beam. Even though FIG. 6 illustrates the first, second, and third layers 120B, 120G, and 120R laminated in this order, it is only an example, and a lamination order may be changed. The HOE 120 having the three layered structure may be formed by using the photosensitive film 120' having a blue photosensitive layer sensitive to a blue light beam, a green photosensitive layer sensitive to a green light beam, and a red photosensitive layer sensitive to a red light beam laminated in the example of FIG. 5. However, when a photosensitive material has a uniform sensitivity to wavelengths of the red, green, and blue light beams, the HOE 120 may be formed in a single-layered structure diffracting all the red, green, and blue light beams.

Figure 7:
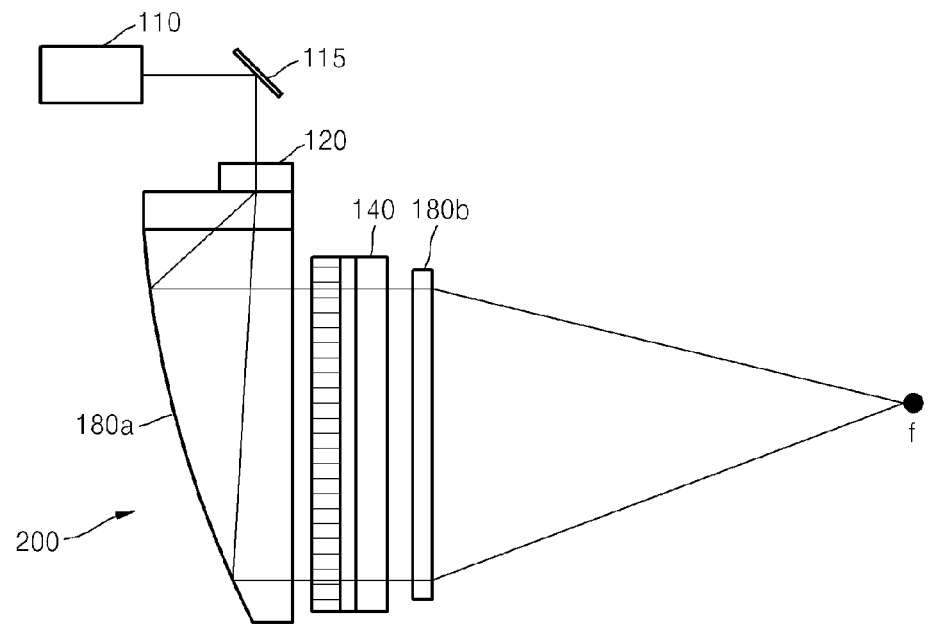
FIG. 7 is a side view schematically illustrating an illumination unit and a holographic 3D image display apparatus including the illumination unit, according to another exemplary embodiment.

FIG. 7 is a side view schematically illustrating an illumination unit according to another exemplary embodiment and a holographic 3D image display apparatus 200 including the same. Referring to FIG. 7, the holographic 3D image display apparatus 200 may include a coherent light source 110, a first projection optical element 180a changing a light beam emitted from the coherent light source 110 into a parallel light beam, an HOE 120 interposed between the coherent light source 110 and the first projection optical element 180a, an SLM 140 modulating an input light beam, and a second projection optical element 180b focusing a light beam modulated by the SLM 140 to focus an image at a predetermined position in space. In FIG. 7, the coherent light source 110, the HOE 120, and the first and second projection optical elements 180a and 180b form the illumination unit.

Compared to the embodiment in FIG. 1, the holographic 3D image display apparatus 200 in FIG. 7 differs in that it further includes the second projection optical element 180b. Also, there is a difference in that the projection optical element 130 in FIG. 1 focuses a light beam, whereas, in the embodiment of FIG. 7, the first projection optical element 180a plays a role of changing a light beam into a parallel light beam, and the second projection optical element 180b focuses the parallel light beam on a focal plane. The first projection optical element 180a may be, for example, an elliptical mirror having a concave reflecting surface. The second projection optical element 180b may be a typical refractive lens, or a Fresnel lens or an HOE lens configured to focus a light beam. In addition, an electrowetting prism array capable of electrically minutely controlling a refractive direction of a light beam may also be used as the second projection optical element 180b.

Figure 8:
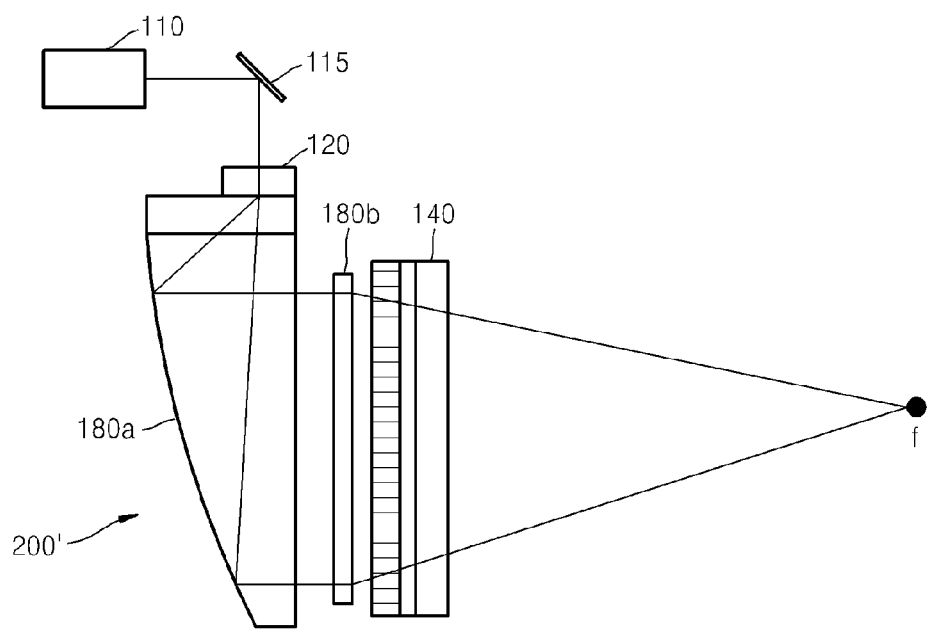
FIG. 8 is a side view schematically illustrating an illumination unit and a holographic 3D image display apparatus including the illumination unit, according to another exemplary embodiment.

FIG. 8 is a side view schematically illustrating an illumination unit and a holographic 3D image display apparatus 200' including the same, according to another embodiment. Referring to FIG. 8, the holographic 3D image display apparatus 200' according to an exemplary embodiment includes a coherent light source 110, a first projection optical element 180a changing a light beam emitted from the coherent light source 110 into a parallel light beam, an HOE 120 interposed between the coherent light source 110 and the first projection optical element 180a, a second projection optical element 180b focusing the parallel light beam onto a focal plane, and an SLM 140 modulating an input light beam. In FIG. 8, the coherent light source 110, the HOE 120, and the first and second projection optical elements 180a and 180b form the illumination unit. Compared to the embodiment in FIG. 7, this embodiment differs in that though the second projection optical element 180b is interposed between the SLM 140 and the focal plane in the holographic 3D image display apparatus 200 in FIG. 7, the second projection optical element 180b is interposed between the first projection optical element 180a and the SLM 140 in the holographic 3D image display apparatus 200' in FIG. 8.

Figure 9:
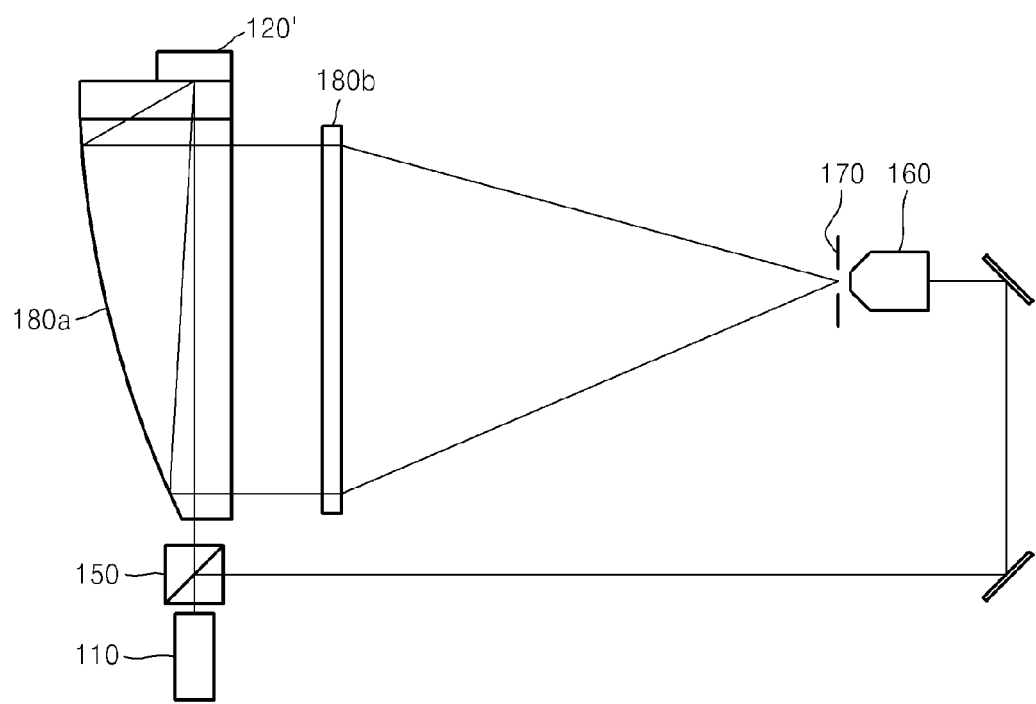
FIG. 9 is a side view schematically illustrating a method of forming a holographic optical element of the illumination unit in FIGS. 7 and 8.

FIG. 9 is a side view schematically illustrating a method of forming the HOE 120 of the illumination unit shown in FIGS. 7 and 8. Referring to FIG. 9, a photosensitive film 120' is disposed on a top surface of the first projection optical element 180a. A position of the photosensitive film 120' is the same as that of the HOE 120 in FIGS. 7 and 8. Also, the light beam emitted from the coherent light source 110 is split into two light beams by using a beam splitter 150. One of the two light beams is incident on a bottom surface of the photosensitive film 120', and the other is incident on an object lens 160 disposed on the focal plane of the second projection optical element 180b. The object lens 160 changes the input light beam to a spherical wave diverged towards the second projection optical element 180b. The object lens 160 may be configured to allow the spherical wave incident on the second projection optical element 180b to become a parallel beam as incident on the second projection optical element 180b.

The parallel light beam passing through the second projection optical element 180b may be focused on the photosensitive film 120' by the first projection optical element 180a. Then, an interference pattern is formed while the light beam directly incident on the bottom surface of the photosensitive film 120' and the light beam incident on the bottom surface of the photosensitive film 120' through the object lens 160 interfere with each other. The interference pattern may be recorded on the photosensitive film 120'. Accordingly, when the photosensitive film 120' having the interference pattern recorded thereon is developed, the HOE 120 shown in FIGS. 7 and 8 may be obtained. As described above, a plurality of HOEs 120a to 120g may be formed by repeating the above-described processes at positions A, B, C, D, E, F, and G.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An illumination unit comprising:
   a first coherent light source which emits a first white visible light beam;
   a second coherent light source which emits a second white visible light beam;
   a projection optical element which focuses the first white visible light beam and the second white visible light beam, respectively emitted from the first coherent light source and the second coherent light source, onto a focal plane;
   a first holographic optical element disposed on an optical path between the first coherent light source and the projection optical element, such that the first white visible light beam is incident on the first holographic optical element, wherein the first holographic optical element comprises a first fixed interference pattern which diffracts the first white visible light beam incident thereon; and
   a second holographic optical element disposed on an optical path between the second coherent light source and the projection optical element, such that the second white visible light beam is incident on the second holographic optical element, wherein the second holographic optical element comprises a second fixed interference pattern which diffracts the second white visible light beam incident thereon;
   wherein the first fixed interference pattern comprises information which diffracts the first white visible light beam incident thereon and thereby cancels an aberration of the projection optical element and the second fixed interference pattern comprise information which diffracts the second white visible light beam incident thereon and thereby cancels an aberration of the projection optical element, and
   wherein the projection optical element and the first holographic optical element are configured to focus the first white visible light beam onto a first point on the focal plane, and the projection optical element and the second holographic optical element are configured to focus the second white visible light bean onto a second point on the focal plane, the second point being different from the first point.

2. The illumination unit according to claim 1, wherein the first holographic optical element and the second holographic optical element are arrayed in a direction perpendicular to an optical axis of the projection optical element.

3. The illumination unit according to claim 1, wherein the projection optical element is an elliptical mirror having a concave reflecting surface.

4. The illumination unit according to claim 1, wherein the projection optical element comprises:
   a first projection optical element which collimates an incident light beam, thereby outputting a parallel light beam; and
   a second projection optical element which focuses the parallel light beam onto the focal plane.

5. The illumination unit according to claim 4, wherein the second projection optical element is one of a refractive lens, a Fresnel lens, a holographic optical lens, and an electrowetting prism array which electrically controls a refractive direction of a light beam.

6. The illumination unit according to claim 1, wherein each of the first holographic optical element and the second holographic optical element comprises a single layer which diffracts red light, green light, and blue light.

7. The illumination unit according to claim 1, wherein each of the first holographic optical element and the second holographic optical element comprises a first layer which diffracts blue light, a second layer which diffracts green light, and a third layer which diffracts red light.

8. A holographic 3 dimensional (3D) image display apparatus comprising:
   a first coherent light source which emits a first white visible light beam;
   a second coherent light source which emits a second white visible light beam;
   a projection optical element which focuses the first white visible light beam and the second white visible light beam, respectively emitted from the first coherent light source and the second coherent light source onto a focal plane;
   a first holographic optical element at least one holographic optical element disposed between the first coherent light source and the projection optical element, such that the first white visible light beam is incident on the first holographic optical element, wherein the first holographic optical element comprises a first fixed interference pattern which diffracts the first white visible light beam incident thereon;
   a second holographic optical element disposed between the second coherent light source and the projection optical element, such that the second white visible light beam is incident on the second holographic optical element, wherein the second holographic optical element comprises a second fixed interference pattern which diffracts the second white visible light beam incident thereon; and
   a spatial light modulator which modulates the first white visible light beam and the second white visible light beam incident thereon and emits a modulated light beam which forms a stereoscopic image on a focal plane of the projection optical element,
   wherein the first fixed interference pattern comprises information which diffracts the first white visible light beam incident thereon and thereby cancels an aberration of the at projection optical element and the second fixed interference pattern comprises information which diffracts the second white visible light beam incident thereon and thereby cancels an aberration of the projection optical element, and wherein the projection optical element and the first holographic optical element are configured to focus the first white visible light beam onto a first point on the focal plane, and the projection optical element and the second holographic optical element are configured to focus the second white visible light beam onto a second point on the focal plane, the second point being different from the first point.

9. The holographic 3D image display apparatus according to claim 8, wherein the first holographic optical element and the second holographic optical element are arrayed in a direction perpendicular to an optical axis of the projection optical element.

10. The holographic 3D image display apparatus according to claim 8, wherein the projection optical element comprises:

a first projection optical element which collimates an incident light beam, thereby outputting a parallel light beam; and a second projection optical element which focuses the parallel light beam onto the focal plane.

11. The holographic 3D image display apparatus according to claim 10, wherein the spatial light modulator is disposed on an optical path between the first projection optical element and the second projection optical element.

12. The holographic 3D image display apparatus according to claim 10, wherein the second projection optical element is disposed on an optical path between the first projection optical element and the spatial light modulator.

13. The holographic 3D image display apparatus according to claim 8, wherein the spatial light modulator is one of a phase modulator which modulates a phase of a light beam incident thereon, an amplitude modulator which modulates a brightness of a light beam incident thereon, and a complex modulator which modulates both a phase and a brightness of a light beam incident thereon.

* * * * *